3,756,901
TWO SHEET OVERLAY AND LAMINATES
COMPRISING THE SAME
Lee E. Veneziale, Jr., Tyrone, Pa., assignor to Westvaco
Corporation, New York, N.Y.
No Drawing. Filed Feb. 8, 1971, Ser. No. 113,631
Int. Cl. B32b *17/12, 21/08, 27/36*
U.S. Cl. 161—6                10 Claims

ABSTRACT OF THE DISCLOSURE

A decorative and functional overlay comprising a sheet of glass fibers and a single decorative, shock-absorbing sheet, both sheets containing polyester resin. The single decorative and shock-absorbing sheet is a saturating grade kraft paper having a basis weight of at least 140 pounds. The sheets may be layed up with and fused directly to a rigidity-imparting base member or the sheets may be consolidated into a thin unitary panel not exceeding 0.024 inch in thickness which may be bonded or glued to a core material. A low pressure laminate with high impact resistance, suitable for horizontal as well as vertical surface applications, is produced by laminating the sheets in particular order to flakeboard having a density of at least about 46 pounds per cubic foot, preferably about 55 pounds per cubic foot.

BACKGROUND OF THE INVENTION

This invention relates to laminated articles and, more particularly, in one aspect it relates to a decorative overlay comprising two sheets of material, saturated with polymerizable unsaturated polyester resin, which can be heat and pressure consolidated to form a composite overlay panel. In another aspect of the invention, the two sheets are layed up with a rigidity-imparting base member and are heat and pressure consolidated to form a low pressure laminated article suitable for use as a general-purpose-type decorative laminate, i.e., one designed for both vertical and horizontal surface applications. As is known, low pressure laminates are generally defined as those laminates which can be cured by the application of heat at relatively low pressures, usually below about 250 p.s.i.

Conventional high pressure laminates, used in horizontal surface applications such as desk tops, counter tops, etc. are well konwn. They are conventionally made from a multiplicity of plies of paper (usually seven or more plies of kraft paper forming the core) saturated with phenolic resins, and include a print sheet, usually of alpha-cellulose paper impregnated with melamine-formaldehyde resin, and in some instances a protective overlay sheet, usually of alpha-cellulose treated with melamine-formaldehyde resin. The kraft sheets forming the core of the laminate provide rigidity when consolidated with the print and overlay sheets under heat and high pressure, usually about 300° F. and about 1000 p.s.i. The laminate then is usually glued or bonded to a substrate, such as plywood, hardboard or particle board, to produce a product suitable for use in horizontal surface applications.

Laminated panels useful as vertical structures, but not possessing sufficient impact resistance and resistance to wear for use as horizontal surfaces, are also well known. Such laminates usually do not include a laminated core structure such as described above for high pressure laminates. These laminates have a lower density than those having a high density laminated core of kraft sheets impregnated with phenolic resins. Often, these lower density laminates are bonded directly to materials such as plywood, particle board, and wall board, to form decorative panels suitable only for vertical surface applications.

Attempts have been made to provide such panels with the properties of panels suitable for horizontal surfaces, but there have been few, if any, satisfactory horizontal panels produced without employing the more expensive phenolic impregnated kraft sheets as core structures and melamine-formaldehyde resin impregnated wear surfaces.

It is a general object of this invention to produce a low pressure decorative laminate suitable for use in horizontal surface applications. Another object of this invention is to produce a two-sheet decorative overlay suitable for bonding to substrates. A further object of this invention is to produce a decorative laminated article having high impact and wear resistance. Other objects, features and advantages of this invention are apparent from the following description.

SUMMARY OF THE INVENTION

The present invention provides a two-sheet overlay which can be used with many low and high density substrates to produce both decorative and functional laminates. It has been found that these laminates may be made with a two-sheet overlay comprising a sheet of glass fibers and a single decorative, shock-absorbing sheet of saturating grade kraft paper having a basis weight of at least 140 pounds, preferably 158 pounds basis weight. In the preferred embodiment of this invention, wherein the two sheets are layed up with a rigidity-imparting substrate, such as, flakeboard or plywood, and heat and pressure consolidated therewith, a low pressure laminate is produced, which meets the NEMA standards of impact resistance and wear resistance for general purpose type decorative laminates.

DETAILED DESCRIPTION OF THE INVENTION

In accordance with the present invention, the two sheet overlay is comprised of a protective overlay sheet and a single decorative and shock-absorbing sheet of saturating grade kraft paper having a basis weight of at least 140 pounds with both of the sheet being impregnated or saturated with curable polyester resin.

The top sheet, which is the protective overlay sheet, is clear and transparent after heat and pressure treatment to form a laminate. The sheet is a fiber glass overlay sheet saturated with unsaturated polyester resin. The fiber glass sheet may be in various forms, such as mats, rovings, yarns, woven goods, or paper sheet-like, the latter glasspaper being preferred. When pressed under heat, the fiber glass sheet affords the laminate with high wear resistance and contributes to the impact resistance of the final product. The fiber glass sheet contains at least about 55% resin by weight and can be highly saturated with resin and in some instances contains by weight up to as much as 85% resin and only 15% glass fibers. It is preferred that the fiber glass sheet contain by weight about 80 to 85% polyester resin.

In the assembly of the laminate, a single sheet of saturating grade kraft paper having a basis weight of at least 140 pounds is placed immediately under the fiber glass protective overlay sheet. The single sheet of saturating kraft paper serves as both a decorative sheet and a shock absorbing sheet. This sheet is generally printed on at least one surface with a design or dyed or pigmented to impart a color thereto as though it were a conventional print sheet. One important aspect of this invention is the ability to print the kraft sheet with a decorative pattern. In the past, kraft paper has not been printed because the relatively coarse fibers do not print well. However, it has been found that high quality printing may be done if the kraft sheet is calendered on the printed side of the sheet. In a preferred embodiment, a so-called, two-layer kraft sheet having a layer of fines on the surface so as to be easily calendered, is used.

The kraft sheet also provides a cushioning effect and absorbs shock upon impact, which, combined with the fiber glass overlay sheet, provides the laminate with high impact and wear resistance. The sheet also functions to bridge any voids and defects which may be present on the surface of the substrate to which the two-sheet overlay may be fused. Although it is necessary to use saturating grade paper having only a basis weight of at least 140 pounds in order to meet the NEMA specifications for impact and wear resistance, it is preferable to use a saturating grade having a basis weight of at least 158 pounds to obtain an overlay having the best all around performance. In fact, saturating grades having a basis weight up to 200 pounds may be used before saturability at conventional machine speeds is impaired. The sheet is impregnated with unsaturated polyester resin and may contain by weight from 50% up to as much as about 65% resin and preferably contains from about 55% to 62% curable polyester resin. As used in this specification, the term "basis weight" means the weight of paper per 3000 square feet.

As stated above, both sheets forming the new overlay are impregnated with polyester resin. The resin is preferably a polymerizable unsaturated polyester resin which forms a thermoset upon curing under heat and pressure. Many such resins are known and may be employed in this invention. While it is preferred that both sheets comprising the overlay of this invention contain the same polyester resin, it is readily apparent that the sheets may contain different types of unsaturated polyester resins.

As is well known, the term polyester resin applies to synthetic resins produced by reacting dibasic acids with dihydric alcohols. Unsaturated polyester resins generally are produced by using a mixture of unsaturated dibasic acids, such as maleic anhydride, fumaric acid, itaconic acid, and citraconic acid, as well as mixtures thereof, and saturated dibasic acids, such as isophthalic acid, adipic acid, azelaic acid, phthalic anhydride, and mixtures thereof. The mixture of saturated and unsaturated dibasic acids is reacted with a dihydric alcohol, such as ethylene glycol, diethylene glycol, propylene glycol, dipropylene glycol, butylene glycol, and mixtures thereof to produce an unsaturated polyester resin. To obtain a greater degree of polymerization, it is customary to blend the resultant unsaturated polyester resin with a reactive monomer, which generally acts as a solvent for the unsaturated polyester and copolymerizes with the unsaturation in the polyester chain to yield a cured, thermoset product. Various unsaturated monomers can be used to cross-link the polyester resin, including vinyl compounds such as styrene, alpha-methyl styrene, vinyltoluene, vinyl acetate, diallyl phthalate, diacetone acrylamide, methyl acrylate, methyl methacrylate, chlorostyrene, divinyl benzene, triallyl cyanurate, and mixtures thereof. For purposes of this specification, the various polyester resins resulting from the above types of acids and alcohols, which may include one or more cross-linking monomers, will be referred to as "polymerizable unsaturated polyester resins." The particular polyester resin employed is not of great importance, and if one type is preferred, it is those resins prepared in known manner from a mixture of isophthalic and fumaric acids at a mole ratio of 1:1 reacted with polypropylene glycol, with the cross-linking monomer for the resulting unsaturated polyester resin being diallyl phthalate. The complete resin will have an average molecular weight between 3,000 and 3,500. Additionally, small amounts, i.e., 5 to 10 percent by weight of hexamethyl methoxy melamine may be used to aid copolymerization. Of course, as is known, the blend of unsaturated polyester resin and cross-linking monomer will preferably include suitable catalysts, such as peroxy compounds, and accelerators, as well as flow control agents.

The polymerizable unsaturated polyester resin can be applied to the sheets forming the overlay of this invention by any suitable application, such as dipping, coating and other means of metering a solvent solution of the resin. Suitable solvents for the resin may be used for coating applications, such as the various ketones and esters including acetone, ethyl ketone, ethyl acetate, and butyl acetate, as well as aromatic solvents such as benzene, toluene, and xylene. The viscosity and resin solids content of the solvent system are adjusted for complete saturation and resin pick-up. The sheets can be surface coated with the unsaturated polyester resin or substantially completely impregnated or saturated with the resin. Regardless of the method of application, it is preferred, but not necessary, that more resin be located on the face of the paper sheet (the side contacting the fiber glass overlay in the laminate) than on the back side thereof. The sheets are dried at temperatures high enough to remove substantially all of the volatiles but not so high that the unsaturated polyester resin will be prematurely cured in the presence of the cross-linking agent.

The two sheets forming the composite overlay of this invention may be combined under heat and pressure to form a unitary overlay panel. This panel generally ranges in thickness between about 0.013 to about 0.024 inch, and it is preferred that it not exceed about 0.021 inch in thickness. The panel, after its consolidation, can be bonded or glued by any suitable means to any suitable substrate, such as plywood, gypsum board, lumber, particle board, hardboard, metal, flakeboard, and cement-asbestos board.

In the preferred method of making the laminated articles of this invention, the two sheets will be layed up with a substrate and bonded to a broad side of the substrate and to each other in one heat and pressure operation. In this way, a heat and pressure consolidated laminate will be prepared which comprises (1) a rigidity-imparting base member, (2) a single shock-absorbing, decorative kraft paper sheet, and (3) a fiber glass overlay sheet fused to the paper sheet, with both of the sheets containing a substantially cured, thermoset polyester resin which in its uncured state is a polymerizable unsaturated polyester resin as defined hereinabove. The lamination can be accomplished by use of a standard heated platen press with one or more openings. Conventional cauls, such as aluminum caul plates, can be used. Any of the many surface finishes on the top surface of the laminate can be obtained by use of known release papers of various finishes inserted between a caul plate and the fiber glass overlay sheet. With the unsaturated polyester resins described above, low pressures and temperatures and relatively short pressing times can be used to cure the resin and form the laminate. For example, with a pressure as low as from about 180 to about 200 p.s.i. and a temperature of about 270–275° F., satisfactory laminates can be made with press times of only about 4½ to 5 minutes. It has been found that under these conditions, the resin flows sufficiently to give the needed surface properties as well as adhesion of the overlay sheets to the substrate.

It will be apparent to those skilled in the art that a suitable backing sheet can also be layed up with the substrate and overlay sheets, and bonded to the back side of the substrate. For instance, a backing sheet comprising alpha-cellulose fibers, saturated with polymerizable unsaturated polyester resin, can be bonded to one broad side of the substrate at the same time that the overlay sheets are bonded to the other broad side of the substrate. When a backing sheet is used, a sheet of release paper is usually placed in the layup between the backing sheet and the caul plate.

In the preferred embodiment of the invention, the two overlay sheets are layed up with a substrate of flakeboard, to produce a lower pressure laminate. Flakeboard is known to be a product prepared by compressing resin-coated wood flakes under heat into a unitary structure. The flakeboard has a density of at least about 46 pounds per cubic foot, preferably at least 55 pounds per cubic foot. It is preferred that the thickness variation of the flakeboard not exceed about plus or minus 0.010 inch in order to have a uniform pressure distribution during the laminating step. It has been found that when the two overlay sheets with the calendered kraft sheet having a basis weight of 140 pounds, are combined with a flakeboard substrate having a density of at least about 55 pounds per cubic foot, the resulting laminate satisfies the requirements of a general purpose laminate and is, surprisingly, suitable for use as a horizontal structure as well as a vertical structure. When the two overlay sheets are placed in the order as described, i.e., the saturating grade kraft sheet next to the flakeboard, with its print sheet facing the fiber glass sheet, the NEMA standards for impact and wear resistance for horizontal surfaces are met. As the basis weight of the kraft sheet is increased, the density of the flakeboard substrate may be reduced somewhat and the impact requirements still may be met. It has been found, for example, that if the fiber glass sheet is arranged in the assembly between the kraft paper sheet and the flakeboard substrate, the decorative flakeboard laminate has a surface with insufficient wear resistance which will fracture when subjected to the 36 inch NEMA impact resistance test (NEMA Standard LD 1–2.15) called for in the specifications for general-purpose-type decorative laminates. Only when the sheets are assembled, from the bottom up, with the kraft paper sheet adjacent the flakeboard substrate, followed by the top sheet of fiber glass, are the standards for impact resistance for horizontal surfaces met. This surprising result is significant since it provides the basis for producing a low pressure laminate with properties required for horizontal structures.

The invention will be described in greater detail with the aid of the following examples. As those skilled in the art will appreciate, the examples are set forth primarily for purposes of illustrating the invention, and are not to be considered as limitations thereon.

Example 1

A general-purpose-type decorative laminate was prepared in accordance with the present invention by laminating two overlay sheets to a flakeboard core.

The top overlay sheet was a 26 pounds basis weight unpigmented sheet, containing by weight about 17% glass fibers and about 83% polymerizable unsaturated polyester resin, and having a thickness of about 8 mils.

The calendered sheet of saturating grade kraft paper was approximately 18 mils thick and had a basis weight of about 158 pounds. The kraft sheet had been printed on one side with ink to form a wood grain pattern. The kraft sheet contained by weight about 55% polymerizable unsaturated polyester resin.

The polymerizable unsaturated polyester resin in each instance comprised as the dibasic acid component a mixture of isophthalic acid and fumaric acid in a 1:1 mole ratio. The dibasic acid mixture was reacted with propylene glycol in a mole ratio of 1:1.05. The average molecular weight of the isophthalic acid-fumaric acid polyethylene glycol, polyester resin was 3,200. In addition, the polyester resin contained about 20% by weight diallyl phthalate as a cross-linking monomer, about ¼% by weight tert-butyl perbenzoate as a catalyst, and about 5% by weight hexamethyl methoxy melamine as another copolymerizer. For spreading the polyester resin onto each of the sheets a conventional solvent system was used and the viscosity was adjusted to 15–30 seconds #4 Ford cup at a 45–60% resin solids content in solution. Both of the above-described sheets were saturated with the polyester resin by conventional dipping procedures and dried.

The flakeboard core for the laminate was about three-quarters inch thick and had a density of about 55 pounds per cubic foot. The flakeboard had been prepared from aspen flakes and contained about 5% urea-formaldehyde resin and about 1% wax emulsion. It has been manufactured by compressing the resin-coated flakes for about 8 minutes in a platen press loaded to about 500 p.s.i. and heated to a temperature of about 315° F.

The layup for producing the decorative laminate comprised an aluminum caul plate followed by a sheet of release paper, the fiber glass sheet, the kraft paper sheet with its printed side next to the fiber glass sheet, and the flakeboard core, and finally another aluminum caul plate. The layup was placed in a laminating press and the laminte was formed and the resin cured by heating for about 5 minutes at 270° F. under a pressure of about 185 p.s.i. Upon cooling, the resultant laminate was suitable for use in both horizontal and vertical applications. The two sheet overlay measured only about 0.021 inch in thickness. The laminate of the flakeboard and overlay sheets met the NEMA Standards for wear resistance and 36 inch impact resistance for general-purpose-type decorative laminates. The following table summarizes the data for a laminate produced in accordance with this example:

| Test | Results | NEMA specifications |
|---|---|---|
| Wear resistance, g./100 cycles. | 0.075 avg | 0.080 max. |
| Resistance of surface to stains. | Satisfactory | Unaffected by reagents 1 through 20. Unaffected by reagent 21 through 29 except for superficial stains. |
| Appearance | do | No listed defects. |
| Resistance to impact height of drop, inches. | 51 (no cracks) | 36. |
| Finish | Satisfactory | As specified. |

Example 2

Example 1 was repeated except that the kraft sheet had a basis weight of about 138 pounds and the flakeboard core for the laminate had a density of about 42 pounds per cubic foot and had a thickness of about ½ inch. Also, a backing sheet was layed up with the other laminate components and bonded to the broad side of the flakeboard core opposite to the broad side to which the overlay sheets were bonded. In this instance, the backing sheet was a 65 pound basis weight alpha-cellulose sheet which had been saturated with about 60% by weight of the polymerizable unsaturated polyester resin.

After consolidation under the conditions described in Example 1, the resultant laminate was suitable for vertical surface application but failed the NEMA Standards for horizontal application for impact and wear resistance. It was therefore unsatisfactory.

From the above examples, it can be seen that a low pressure laminate with surprisingly high impact resistance can be produced for use in horizontal surface applications, by use of a particular combination and size of overlay sheets heretofore unknown in the art. While flakeboard has been disclosed as the preferred core material, other suitable materials can be used to make low pressure laminates having great utility in vertical surface applications. Furthermore, relatively thin (not exceeding 0.024 inch in thickness) unitary panels can be produced from the overlay sheets and subsequently glued to various substrates to make decorative and functional laminates. Such panels also find great utility in post-forming operations because of the flexibility of polyester resins.

As stated, the laminates of this invention are not dependent upon the use of a particular polymerizable unsaturated polyester resin. Those skilled in the art will appreciate that any such polyester resin may be used to saturate the sheets forming the overlay of the present invention, as long as the resin is curable at the temperatures and pressures and for the times set forth herein for the manufacture of low pressure laminates. One suitable, commercially available polyester resin is Reichhold Chemical Company's Polylite 93–516. An isophthalic-type of unsaturated polyester resin is preferred but the present invention is not limited thereto.

As one skilled in the art will appreciate, various changes may be made in the examples and descriptions set forth

I claim:
1. A unitary, heat and pressure consolidated decorative laminate which comprises: a rigidity-imparting base member; a shock-absorbing, decorative sheet of saturating grade kraft paper having a basis weight of at least 140 pounds and containing by weight about 50% to 65% resin bonded to said base member; and a transparent fiber glass overlay sheet containing by weight about 55% to about 85% resin bonded to said kraft sheet; both of said sheets containing a substantially cured, thermoset polyester resin which in its uncured state is a polymerizable unsaturated polyester resin, said cured resin bonding said sheets to each other and to said base member at a pressure below about 250 p.s.i.

2. The laminated article of claim 1 wherein the shock-absorbing, decorative sheet is a single sheet of calendered saturating grade kraft paper having a basis weight of at least 158 pounds and containing by weight about 55% to about 62% polyester resin.

3. The laminated article of claim 1 wherein the rigidity-imparting base member is flakeboard having a density of at least 46 pounds per cubic foot.

4. A low pressure decorative laminate suitable for use in horizontal surface applications comprising the heat and pressure consolidated unitary structure having the following laminae in the order of ascending superimposed relationship:
   (a) a flakeboard base member having a density of at least about 55 pounds per cubic foot,
   (b) a sheet of saturating grade kraft paper having a basis weight of at least 158 pounds impregnated with a thermosetting polyester resin, and
   (c) an unpigmented fiber glass sheet impregnated with a thermosetting polyester resin,
wherein the thermosetting resin in each sheet is converted to the thermoset state during consolidation to the unitary structure, to fuse the sheets to each other and to the flakeboard.

5. The low pressure laminate of claim 4 in which the flakeboard carried on its top broad side the sheets (b) and (c) in superimposed relationship, and carries on its bottom broad side bonded thereto a backing sheet impregnated with a thermoset polyester resin which in its uncured state is a polymerizable unsaturated polyester resin.

6. A decorative laminated article having high impact resistance, suitable for use in horizontal surface applications, which comprises:
   (a) a flakeboard base member having a density of at least about 55 pounds per cubic foot, and
   (b) a decorative two-sheet overlay bonded to one broad surface of the flakeboard base member, said decorative overlay comprising;
      (1) a transparent fiber glass sheet containing by weight about 80 to 85% polyester resin, and
      (2) a saturating grade, calendered sheet of kraft paper having a basis weight of at least 158 pounds containing by weight about 55 to 62% polyester resin and having a printed design on one side thereof, and
   said polyester resin, which in its uncured state is a polymerizable unsaturated polyester resin, in said overlay sheets being substantially cured and bonding said overlay sheets to each other and to the flakeboard base member, and bonded thereto and said fiber glass sheet being bonded to said printed kraft paper sheet on its printed side.

7. The decorative laminated article of claim 5 wherein the two-sheet overlay has a thickness not exceeding about 0.024 inch.

8. A unitary, laminated product having a thickness not exceeding about 0.024 inch, suitable for use as a decorative overlay for substrates, which comprises a decorative, shock-absorbing sheet of saturating grade calendered kraft paper having a basis weight of at least 140 pounds having a printed design on one side thereof and a transparent glass fiber sheet fused on one side thereof to the printed side of the decorative sheet, said sheets being saturated with and unitarily fused to each other by a substantially cured polyester resin which in its uncured state is a polymerizable unsaturated polyester resin.

9. The laminated product of claim 8 in which the saturating grade kraft paper sheet has a basis weight of at least 158 pounds and containing by weight about 50 to 65% polyester resin.

10. The laminated product of claim 9 in which the glass fiber sheet contains by weight about 55 to 85% polyester resin.

References Cited
UNITED STATES PATENTS

| | | | |
|---|---|---|---|
| 3,135,643 | 6/1964 | Michl | 161—413 X |
| 3,537,950 | 11/1970 | Hale | 161—413 X |
| 3,294,619 | 12/1966 | Noland | 161—413 X |
| 3,186,866 | 6/1965 | Claeys | 161—97 X |
| 3,445,312 | 5/1969 | Rider | 161—413 X |
| 3,018,206 | 1/1962 | Hood et al. | 161—82 X |
| 2,568,349 | 9/1951 | McKee | 161—137 |
| 3,671,377 | 6/1972 | Marra | 161—162 |
| 3,663,341 | 5/1972 | Veneziale | 161—6 |

ALFRED L. LEAVITT, Primary Examiner
R. A. DAWSON, Assistant Examiner

U.S. Cl. X.R.
161—82, 93, 97, 232, 268, 413, Digest 4

PO-1050
(5/69)

UNITED STATES PATENT OFFICE
CERTIFICATE OF CORRECTION

Patent No. 3,756,901     Dated September 4, 1973

Inventor(s) Lee E. Veneziale, Jr.

It is certified that error appears in the above-identified patent and that said Letters Patent are hereby corrected as shown below:

Column 2, line 39, "sheet" should read -- sheets --.

Claim 6, Column 8, line 3, "the" should read -- by --.

Signed and sealed this 5th day of March 1974.

(SEAL)
Attest:

EDWARD M. FLETCHER, JR.                C. MARSHALL DANN
Attesting Officer                       Commissioner of Patents